(12) United States Patent
Gora et al.

(10) Patent No.: US 9,565,691 B2
(45) Date of Patent: Feb. 7, 2017

(54) CARRIER SELECTION IN RELAY SYSTEMS

(75) Inventors: Jacek Gora, Wroclaw (PL); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/990,074

(22) PCT Filed: Nov. 29, 2010

(86) PCT No.: PCT/EP2010/068373
§ 371 (c)(1),
(2), (4) Date: May 29, 2013

(87) PCT Pub. No.: WO2012/072097
PCT Pub. Date: Jun. 7, 2012

(65) Prior Publication Data
US 2013/0250900 A1  Sep. 26, 2013

(51) Int. Cl.
H04W 4/00 (2009.01)
H04W 72/10 (2009.01)
H04W 72/08 (2009.01)
H04W 72/06 (2009.01)

(52) U.S. Cl.
CPC ............ H04W 72/10 (2013.01); H04W 72/08 (2013.01); H04W 72/06 (2013.01); H04W 72/082 (2013.01)

(58) Field of Classification Search
CPC .... H04W 72/10; H04W 72/082; H04W 72/06; H04W 72/1242; H04W 84/047; H04W 40/22; H04W 88/04; H04B 7/15542; H04L 12/5695; H04L 45/302; H04L 47/805; H04L 47/822

USPC ..... 370/315, 329, 351; 455/450, 452.2, 512, 455/513

See application file for complete search history.

(56) References Cited

U.S. PATENT DOCUMENTS

| | | | | |
|---|---|---|---|---|
| 5,507,034 | A  * | 4/1996 | Bodin et al. | 455/452.2 |
| 2007/0142067 | A1 | 6/2007 | Cheng et al. | 455/512 |
| 2007/0217433 | A1* | 9/2007 | Doppler et al. | 370/400 |
| 2008/0002608 | A1* | 1/2008 | Zheng et al. | 370/328 |
| 2009/0296668 | A1* | 12/2009 | Capone et al. | 370/337 |
| 2010/0291935 | A1* | 11/2010 | Rudrapatna et al. | 455/450 |
| 2011/0164527 | A1* | 7/2011 | Mishra et al. | 370/252 |

FOREIGN PATENT DOCUMENTS

| | | |
|---|---|---|
| DE | 19505243 | 8/1996 |
| EP | 1206055 A2 | 5/2002 |
| EP | 1217852 A1 | 6/2002 |
| WO | WO95/07013 | 3/1995 |
| WO | WO2010/076773 A2 | 7/2010 |
| WO | WO2010/134162 A1 | 11/2010 |

* cited by examiner

*Primary Examiner* — Marsha D Banks Harold
*Assistant Examiner* — Elton Williams
(74) *Attorney, Agent, or Firm* — Harrington & Smith

(57) ABSTRACT

At one node of a series of nodes supporting a series of wireless links to at least one communication device, transmitting information to assist the selection at at least one other node of said series of nodes of one or more carriers for the wireless link between said at least one other node and said communication device and/or a wireless link between said at least one other node and a further node of said series of nodes between said at least one other node and said communication device.

12 Claims, 8 Drawing Sheets

CARRIER SELECTION IN RELAY SYSTEMS

The present invention relates to the selection of carriers in a communication system employing relay nodes to provide a communication device with access to a wider communication system.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B (NB)' or "eNode B (eNB)". Typically the operation of a base station apparatus and other apparatus of an access system required for the communication is controlled by a centralised control entity (which centralised control entity is typically interconnected with other centralised control entities of the particular communication network), or every base station (e.g. eNodeB) contains its own local control entity. Examples of cellular access systems include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (E-UTRAN).

Relay nodes are intermediate access nodes via which a user equipment can access a main access node. Some aims of relay nodes in cellular radio access networks include: extending coverage of the radio access network; providing high-bit-rate coverage in high shadowing environments; reducing average radio-transmission power and thereby better conserving battery power at user equipments; enhancing cell capacity and effective throughput by, for example, increasing cell-edge capacity and balancing cell load; and enhancing the overall performance and deployment cost of the radio access network.

The cellular radio access network includes a network of main access nodes to which a user equipment in the right environment/location can establish a direct wireless connection. User equipments at disadvantaged positions such as cell edges and high shadowing areas can have access to a main access node via the combination of a wireless connection between the user equipment and a relay node and a wireless connection between the relay node and the main access node.

In the Long Term Evolution (LTE) System Release 8, downlink transmissions are made according to an orthogonal frequency division multiple access (OFDMA) technique, and uplink transmissions are made according to a single carrier frequency division multiple access (SCFDMA) technique. Each transmission is made using a group of orthogonal sub-carriers. Sub-carriers are grouped into units called resource blocks, and a communication device can make or receive transmissions using groups of resource blocks ranging up to a predetermined maximum number of resource blocks within a predetermined frequency block called a component carrier. The bandwidth available for transmissions between a device and a radio access network node generally comprises a plurality of component carriers; and each transmission is made on a selected one of the component carriers. A further development of LTE Release 8 (which development is known as LTE-Advanced) provides for carrier aggregation, where two or more component carriers are aggregated in order to support transmission bandwidths wider than that defined by a single component carrier. In summary, devices operating under LTE Release 8 are served by a single component carrier, whereas devices operating under LTE-Advanced can receive or transmit simultaneously on a plurality of component carriers.

Irrespective of whether a single component carrier or a plurality of component carriers are used for transmissions by the nodes in a relay system, there has been identified the challenge of providing an efficient technique of controlling interference between such transmissions.

It is an aim to meet this challenge.

There is provided a method, comprising: at one node of a series of nodes supporting a series of wireless links to at least one communication device, transmitting information to assist the selection at at least one other node of said series of nodes of one or more carriers for the wireless link between said at least one other node and said communication device and/or a wireless link between said at least one other node and a further node of said series of nodes between said at least one other node and said communication device.

In one embodiment, said information indicates one of a plurality of predefined priority levels for each of a plurality of carriers.

In one embodiment, said information indicates one of at least three predefined priority levels for each of a plurality of carriers.

In one embodiment, the method further comprises assigning one of said plurality of predefined priority levels to a carrier according to the level of interference risk associated with that carrier.

In one embodiment, the method further comprises: assigning a low one of the predefined priority levels to a carrier which is (i) used for a wireless link between said one node and a communication device or another node in said series of nodes; assigning a medium one of the predefined priority levels to a carrier which is (ii) adjacent in the frequency spectrum to a carrier used for a wireless link between said one node and a communication device or another node in said series of nodes; and assigning a high one of the predefined priority levels for a carrier not meeting conditions (i) and (ii).

In one embodiment, the method further comprises: comprising selecting one of said predefined priority levels for at least one carrier taking into account the one of the predefined priority levels assigned to said carrier by another node in the series of nodes.

There is also provided a method, comprising: at one node of a series of relay nodes supporting a series of wireless links to at least one communication device, selecting one or more carriers for the wireless link between said one node and said at least one communication device or another node of said series of nodes between said one node and said at least one communication device with reference to information received from a preceding node in said series of nodes.

In one embodiment, the selecting is carried out with reference to said information received from said preceding node in said series of nodes and measurements made at said one node and/or one or more devices in communication with said one node.

In one embodiment, the selecting takes into account a predetermined weighting given to the information received from said preceding node in said series of nodes, and a predetermined weighting given to said measurements.

In one embodiment, said information indicates one of a plurality of predefined priority levels for each of a plurality of carriers.

In one embodiment, said information indicates one of at least three predefined priority levels for each of a plurality of carriers.

In one embodiment, each carrier comprises a block of orthogonal sub-carriers.

There is also provided an apparatus comprising a processor and memory including computer program code, wherein the memory and computer program code are configured to, with the processor, cause the apparatus to: at one node of a series of nodes supporting a series of wireless links to at least one communication device, transmit information to assist the selection at at least one other node of said series of nodes of one or more carriers for the wireless link between said at least one other node and said communication device and/or a wireless link between said at least one other node and a further node of said series of nodes between said at least one other node and said communication device.

In one embodiment, said information indicates one of a plurality of predefined priority levels for each of a plurality of carriers.

In one embodiment, said information indicates one of at least three predefined priority levels for each of a plurality of carriers.

In one embodiment, the memory and computer program code are configured to, with the processor, cause the apparatus to assign one of said plurality of predefined priority levels to a carrier according to the level of interference risk associated with that carrier.

In one embodiment, the memory and computer program code are configured to, with the processor, cause the apparatus to: assign a low one of the predefined priority levels to a carrier which is (i) used for a wireless link between said one node and a communication device or another node in said series of nodes; assign a medium one of the predefined priority levels to a carrier which is (ii) adjacent in the frequency spectrum to a carrier used for a wireless link between said one node and a communication device or another node in said series of nodes; and assign a high one of the predefined priority levels for a carrier not meeting conditions (i) and (ii).

In one embodiment, the memory and computer program code are configured to, with the processor, cause the apparatus to: select one of said predefined priority levels for at least one carrier taking into account the one of the predefined priority levels assigned to said carrier by another node in the series of nodes.

There is also provided an apparatus comprising a processor and memory including computer program code, wherein the memory and computer program code are configured to, with the processor, cause the apparatus to: at one node of a series of relay nodes supporting a series of wireless links to at least one communication device, select one or more carriers for the wireless link between said one node and said at least one communication device or another node of said series of nodes between said one node and said at least one communication device with reference to information received from a preceding node in said series of nodes.

In one embodiment, the memory and computer program code are configured to, with the processor, cause the apparatus to: carry out the selecting with reference to said information received from said preceding node in said series of nodes and measurements made at said one node and/or one or more devices in communication with said one node.

In one embodiment, the memory and computer program code are configured to, with the processor, cause the apparatus to: carry out the selecting taking into account a predetermined weighting given to the information received from said preceding node in said series of nodes, and a predetermined weighting given to said measurements.

In one embodiment, said information indicates one of a plurality of predefined priority levels for each of a plurality of carriers.

In one embodiment, said information indicates one of at least three predefined priority levels for each of a plurality of carriers.

In one embodiment, each carrier comprises a block of orthogonal sub-carriers.

There is also provided an apparatus configured to carry out any of the above-described methods.

There is also provided a base station, eNodeB or relay node comprising any of the above-described apparatus.

There is also provided a computer program product comprising program code means which when loaded into a computer controls the computer to: at one node of a series of nodes supporting a series of wireless links to at least one communication device, transmit information to assist the selection at at least one other node of said series of nodes of one or more carriers for the wireless link between said at least one other node and said communication device and/or a wireless link between said at least one other node and a further node of said series of nodes between said at least one other node and said communication device.

There is also provided a computer program product comprising program code means which when loaded into a computer controls the computer to: at one node of a series of relay nodes supporting a series of wireless links to at least one communication device, select one or more carriers for the wireless link between said one node and said at least one communication device or another node of said series of nodes between said one node and said at least one communication device with reference to information received from a preceding node in said series of nodes.

Hereunder is provided, by way of example only, a detailed description of techniques related to the selection of carriers in a system employing relay nodes, with reference to the accompany drawings, in which:

FIG. 4b illustrates an example of a reconfiguration of the set of relay nodes illustrated in FIG. 4a;

FIG. 5 illustrates one example of operations carried out at DeNB of FIG. 4a;

The following description relates to the example of a communication system including a radio access network operating in accordance with Long Term Evolution (LTE) Release 8 or Release 9 or Release 10 or beyond.

Figure 1:
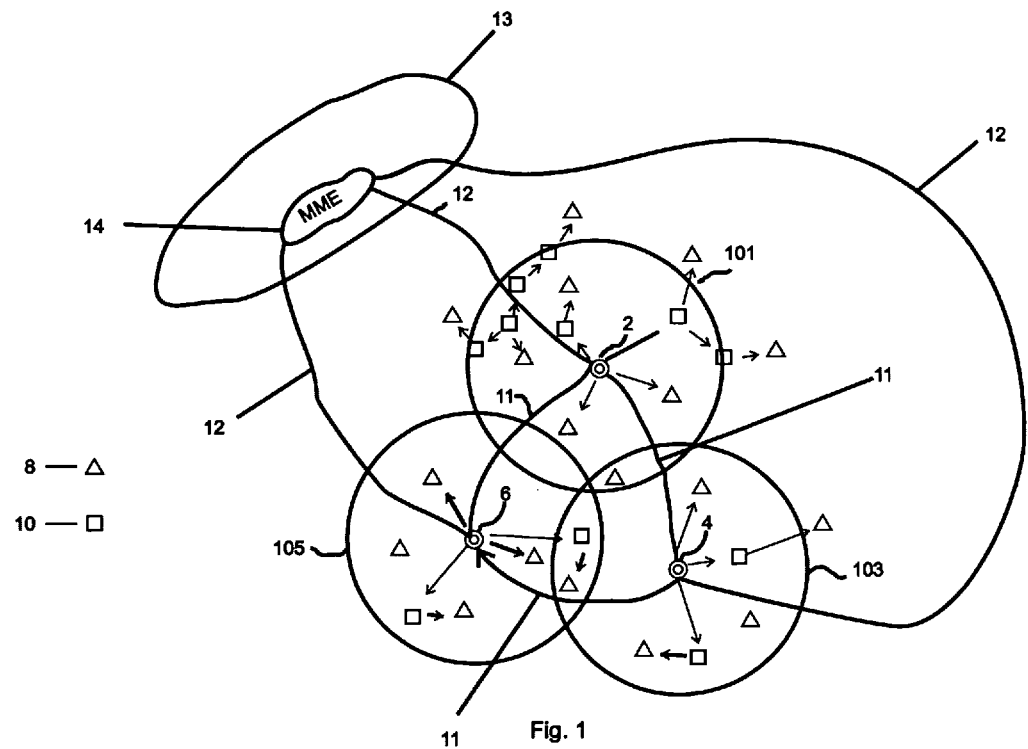
FIG. 1 illustrates an example of a communication system including a radio access network involving relay nodes.

FIG. 1 illustrates an example of a cellular E-UTRAN deploying relay nodes.

For simplicity, only three cells 101, 103, 105 are shown in FIG. 1, but a large cellular radio access network can have tens of thousands of cells.

The E-UTRAN includes a network of base stations 2, 4, 6 (eNBs). The eNBs each have a direct link 12 (known as a S1 link) to a mobile management entity 14 of an evolved packet core (EPC) network 13 associated with the E-UTRAN. The eNBs 2, 4, 6 can also establish links 11 between themselves other than via the EPC network 13, which links 11 are referred to as X2 links. These X2 links 11 are used, for example, at the time of a handover of a user equipment (UE) 8 from one eNB to another. For example, when a handover is performed, data that have not already reached the UE at the source eNB can be forwarded via the X2 link to the target eNB and be delivered to the UE there. However there are also further optimizations that can be done if a link between neighboring eNBs exists e.g. Inter Cell Interference Coordination (ICIC), where cells negotiate which signals to send on which resources in order to allow a better operation of UEs at the cell border due to smartly controlling the interference that is received from the other cell.

Figure 2:
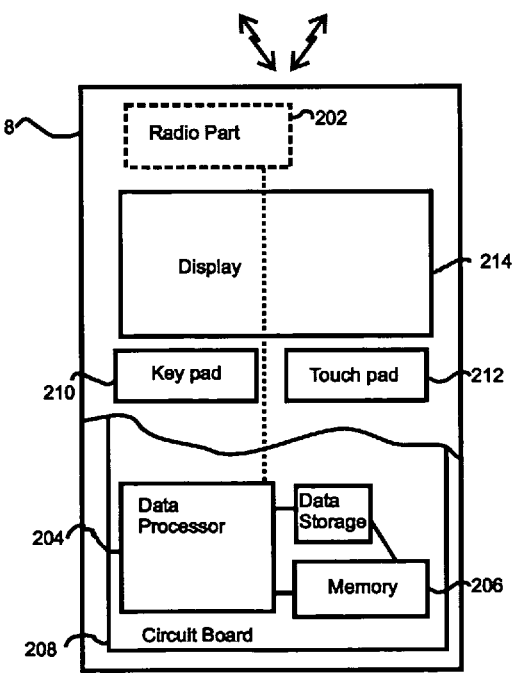
FIG. 2 illustrates some components of one example of user equipment as shown in FIG. 1.

FIG. 2 illustrates some components of one example of user equipment as shown in FIG. 1. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 202 and associated antenna arrangement. The antenna arrangement may be arranged internally or externally to the UE 8.

The UE 8 may be provided with at least one data processing entity 204 and at least one memory or data storage entity 206 for use in tasks it is designed to perform. The data processor 204 and memory 206 may be provided on an appropriate circuit board 208 and/or in chipsets.

The user may control the operation of the UE 8 by means of a suitable user interface such as key pad 210, voice commands, touch sensitive screen or pad 212 combinations thereof or the like. A display 214, a speaker and a microphone may also be provided. Furthermore, the UE 8 may comprise appropriate connectors (either wired or wireless) to other devices and/or for connecting external accessories, for example hands-free equipment, thereto.

Figure 3:
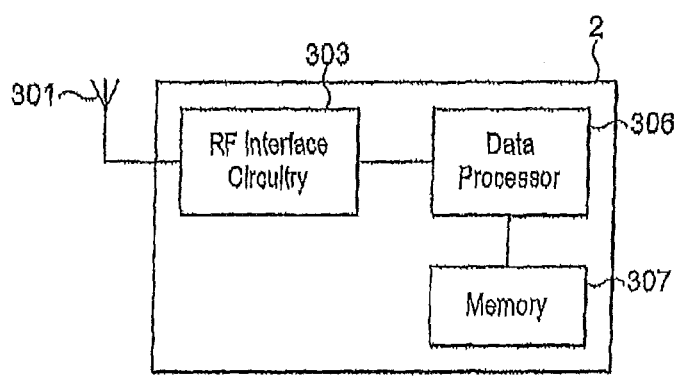
FIG. 3 illustrates some components of an example of an apparatus suitable for the access nodes shown in FIG. 1.

FIG. 3 illustrates some components of an example of an apparatus suitable for the access nodes shown in FIG. 1. The apparatus 2 may comprise a radio frequency antenna 301 configured to receive and transmit radio frequency signals, radio frequency interface circuitry 303 configured to interface the radio frequency signals received and transmitted by the antenna 301. The radio frequency interface circuitry may also be known as a transceiver. The apparatus 2 may also comprise a data processor 306 configured to process signals from the radio frequency interface circuitry 303, control the radio frequency interface circuitry 303 to generate suitable RF signals. The access node may further comprise a memory 307 for storing data, parameters and instructions for use by the data processor 306.

It will be understood that both the UE 8 and access nodes shown in FIGS. 2 and 3 respectively and described above may comprise further elements which are not directly involved with the embodiments described hereafter.

UEs 8 in the right environment/location can establish a direct wireless connection with one of the eNBs 2, 4, 6. UEs 8 at relatively disadvantaged positions such as cell edges and high shadowing areas can have access to an eNB 2, 4, 6 via one or more relay nodes 10 (RN) In this case, the eNB is referred to as a donor eNB (DeNB).

The UEs 8 cannot distinguish between eNBs 2, 4, 6 and RNs 10. The RNs 10 have the same Release 8 and 9 eNB cell parameters as the eNBs 2, 4, 6 and broadcast them so that they are recognized as a normal eNB by the UEs. A DeNB acts like a proxy for both S1 and X2 signalling to and from the RN 10, thereby effectively hiding the RN 10 from the EPC 13. In other words, from the point of view of the EPC 13, the relayed UEs 8 are connected directly to the DeNB, and the RN 10 appears like an ordinary cell, sometimes called sector, within the DeNB.

Figure 4A:
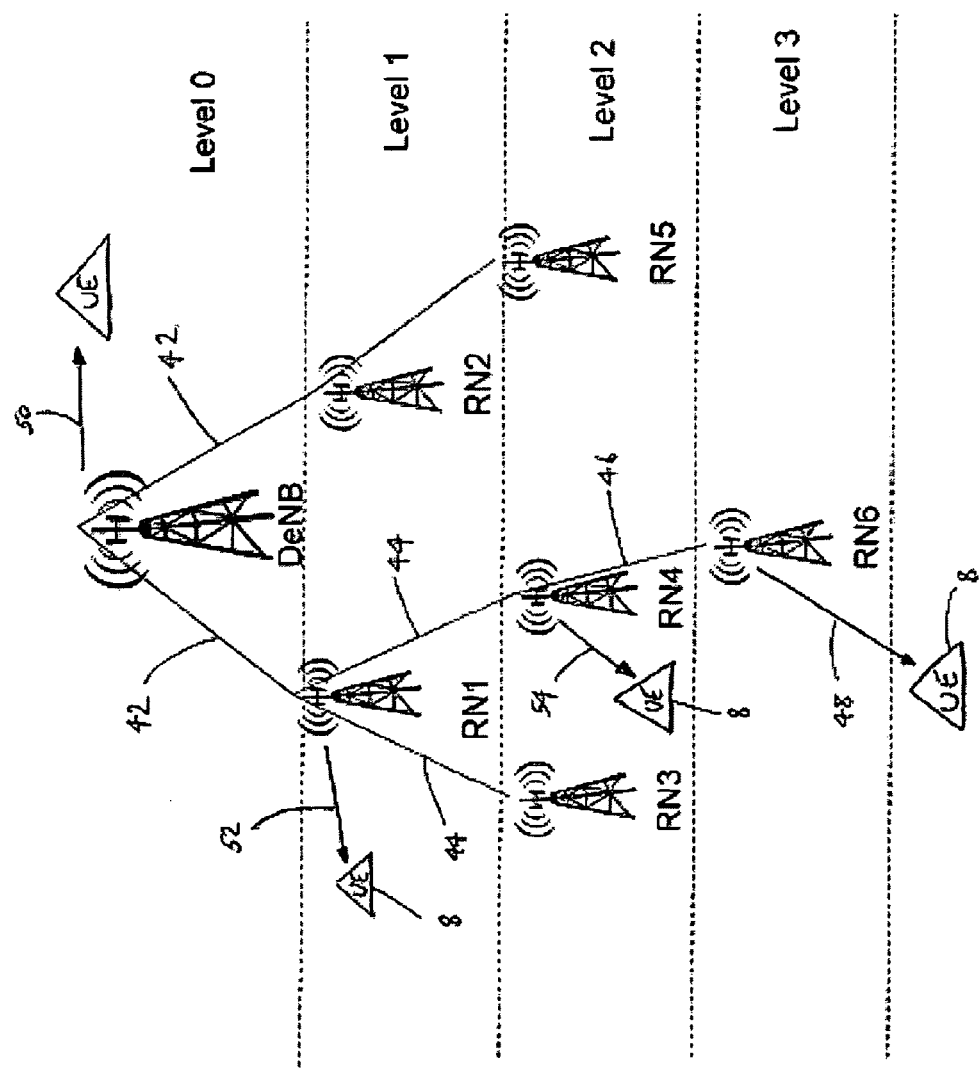
FIG. 4a illustrates a subset of the relay nodes associated with eNB 2 in FIG. 1.

The DeNB 2 and one subset of the relay nodes illustrated in FIG. 1 is shown in FIG. 4a, in which some of the relay nodes themselves are linked to the DeNB 2 by one or more other relay nodes. Each relay node has a level k, where k is the number of hopes between the relay node and the DeNB. In FIG. 4a: DeNB 2 is a level 0 node; RN1 and RN4 are level 1 nodes; RN3, RN4, and RN5 are level 2 nodes; and RN6 is a level 3 node.

Figure 8:
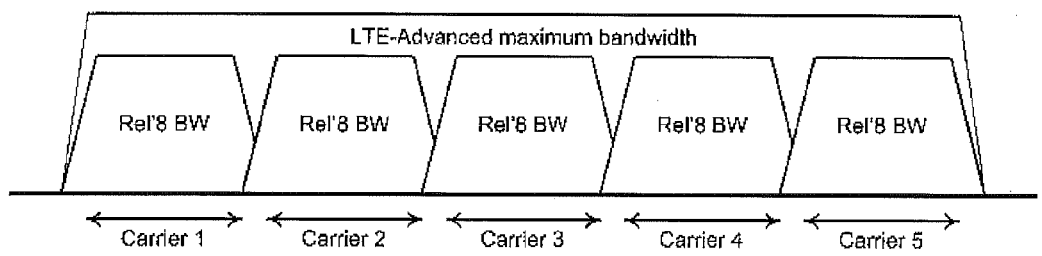
FIG. 8 illustrates the division of the frequency spectrum into component carriers.

With reference to FIG. 8, the spectrum available for transmissions by the DeNB 2, the relay nodes 10 and the UEs 8 is divided into CCs each of equal or different bandwidth; and bandwidth extension beyond the bandwidth of one single CC is accomplished via aggregation of two or more of these CCs. Described below is a procedure for selecting component carriers for transmissions from the series of nodes including DeNB, RN1, RN4 and RN6 of FIG. 4a. The following description focuses solely on this series of nodes for the sake of simplicity, but the same kind of procedures would also apply to the other nodes of the topology illustrated in FIG. 4a. Each of RN1, RN4 and RN6 are configured to autonomously select one or more component carriers (CCs) for transmissions from that node, either to a user equipment 8 or to another relay node 10.

As part of the initial RN attach procedure, DeNB selects (STEP 502) one or more component carriers for the wireless link to RN1 and any other level 1 relay nodes (DeNB relay link 42) and/or the wireless link to any UE in direct communication with DeNB 2 (DeNB access link 50). DeNB assigns (STEP 504) one of a plurality of predefined priority levels to each CC, and sends (STEP 506) an indication of the assigned priority levels to RN1. In more detail, DeNB assigns priority level 0 to the one or more CCs used for the DeNB relay and access links; assigns priority level 1 to the any CCs adjacent to the level 0 CCs in the frequency spectrum; and assigns priority level 2 to any other CCs. With reference to the detailed description below, the priority levels assigned to each CC by the DeNB influence the selection of CCs at higher level nodes. The above-described example of assigning to each CC one of only three priority levels is useful, for example, where it is considered sufficient to try and prevent reuse of CCs at the next two higher levels of relay nodes, but not at yet higher levels because the risk of interference between transmissions by nodes separated by more than two levels is limited enough to avoid making it necessary to try and prevent the reuse of CCs. Where it is considered necessary to try and prevent reuse of CCs at more levels, the DeNB could assign to any CCs not used for the DeNB access and relay links or adjacent CCs a priority level more remote from the priority levels assigned to the adjacent CCs. For example, if it is considered necessary to try and prevent reuse of CCs at the next three higher levels of relay nodes, the DeNB could: assign priority level 0 to the one or more CCs used for the DeNB relay and access links; assign priority level 1 to any CCs adjacent to the level 0 CCs in the frequency spectrum; and assign priority level 3 to any other CCs.

DeNB transmits this set of CC priority level information using the X2 or S1 signalling discussed above. DeNB also determines whether or not to use in-band or out-band operation on one or more CCs used for the DeNB relay link 42. In other words, DeNB decides whether the one or more CCs used for the DeNB relay link 42 are also to be used for at least the wireless link from RN1 to any UE in direct communication with RN1 (RN1 access link 52) and communicates this decision to RN1 by means of a flag in X2 or S1 signalling.

The above-mentioned CC priority level information and in-band/outband flag is received by RN1 (STEP 602). If in-band operation is indicated, RN1 is forced to use for the RN1 access link 52 the same one or more CCs used for the DeNB relay link 42. RN1 can choose to use the same one or more CCs also for RN1 relay link 44, or RN1 can choose to autonomously select a different one of more CCs for the RN1 relay link (44), using the kind of selection technique discussed in detail below. RN1 can identify which one or more CCs are used for the DeNB relay link 42 by determining which CCs were assigned CC priority level 0 by DeNB. On the other hand, if out-band operation is indicated, RN1 makes an autonomous selection of one or more CCs for the RN1 access link 52 and RN1 relay link 44. RN1 selects (STEP 604) one or more CCs based on the priority level information received from DeNB and on the basis of signal measurements made either directly by RN1 or signal measurements made by UEs in communication with RN1 and communicated to RN1. Where the local criteria for the CC selection are permitting, RN1 aims to: select one or more CCs having the highest possible priority level (i.e. 2 in the example described here); and only select one or more CCs with a lower priority level (e.g. 1) if there happens to be not the required number of CCs having the highest priority level. Alternatively, local measurements can override the priority level information received at RN1 from DeNB. For example, even if a CC is indicated as low priority (i.e. 0 and 1 in the example described here) in the set of CC priority level information received at RN1 from DeNB, but the local measurements indicate that no strong interference is measured by RN1 on this CC, the RN1 can treat this CC as if it has a higher level of priority, for example 1 instead of 0, or 2 instead of 1. Other ways to combine priority levels and local measurements can be also used. For example the CC selection can be done with reference to a predefined weighting for the priority level received in the set of CC priority level information received at RN1 from the DeNB and a predefined weighting for a CC priority level derived from local measurements.

After selection of one or more CCs for the RN1 access and relay links, RN1 generates (STEP 606) its own set of CC priority level information. In more detail, RN1 assigns priority level 0 to the one or more CCs used for the RN1 access and relay links 44, 52; and assigns priority level 1 to any CCs adjacent to the selected one or more CCs in the frequency spectrum. For any remaining one or more CCs, RN1 takes the values assigned to such CCs by the DeNB (as specified in the set of CC priority level information received from the DeNB) and increases each of them by +1 up to a maximum priority level of, for example, 2. The RN1 transmits (STEP 608) this set of CC priority level information by X2 or S1 signalling for reception at the level 2 relay nodes associated with RN1. RN1 also decides whether the one or more CCs used for the RN1 relay link 44 are also to be used for at least the wireless link from the level 2 relay nodes to any UE 8 in direct communication with those level 2 relay nodes (e.g. RN4 access link 52), and transmits this decision by means of a in-band/out-band flag in X2 or S1 signalling for reception at the level 2 relay nodes (e.g. RN4).

RN4 repeats the kind of operations carried out at RN1. Specifically, for each link for which RN4 is free to, and decides to, autonomously select one or more CCs (RN4 makes the autonomous selection of one or more CCs based on the priority level information received from RN1 (STEP 602) and on the basis of signal measurements made either directly by RN4 or signal measurements made by UEs 8 in communication with RN4 and communicated to RN4 (STEP 604). Also, RN4 generates (STEP 606) its own set of CC priority level information in the same way as described above for RN1, and decides on in-band or out-band operation for the one or more CCs used for the RN4 relay link; and transmits (STEP 608) this information by X2 or S1 signalling for reception by RN6 (STEP 702).

Unless RN6 is bound to follow in-band operation for the RN6 access link 48, RN6 makes an autonomous selection of one or more CCs for the RN6 access link 46 based on the priority level information received from RN4 (STEP 702) and on the basis of signal measurements made either directly by RN6 or signal measurements made by UEs 8 in communication with RN6 and communicated to RN6 (STEP 704).

If a new relay node is introduced into the system, then the new relay node receives the CC priority level information from DeNB or from an existing relay node between the new relay node and the DeNB (more specifically, the highest level node of a series of relay nodes between the new relay node and the DeNB); and performs CC selection for its access link as described above for RN1 and RN4. If the new relay node has a relay link to another relay node of a higher level than itself, the new relay node also performs CC selection for the relay link as described above for RN1 and RN4, and also generates its own set of CC priority level information for transmission to the higher level node.

Figure 4B:
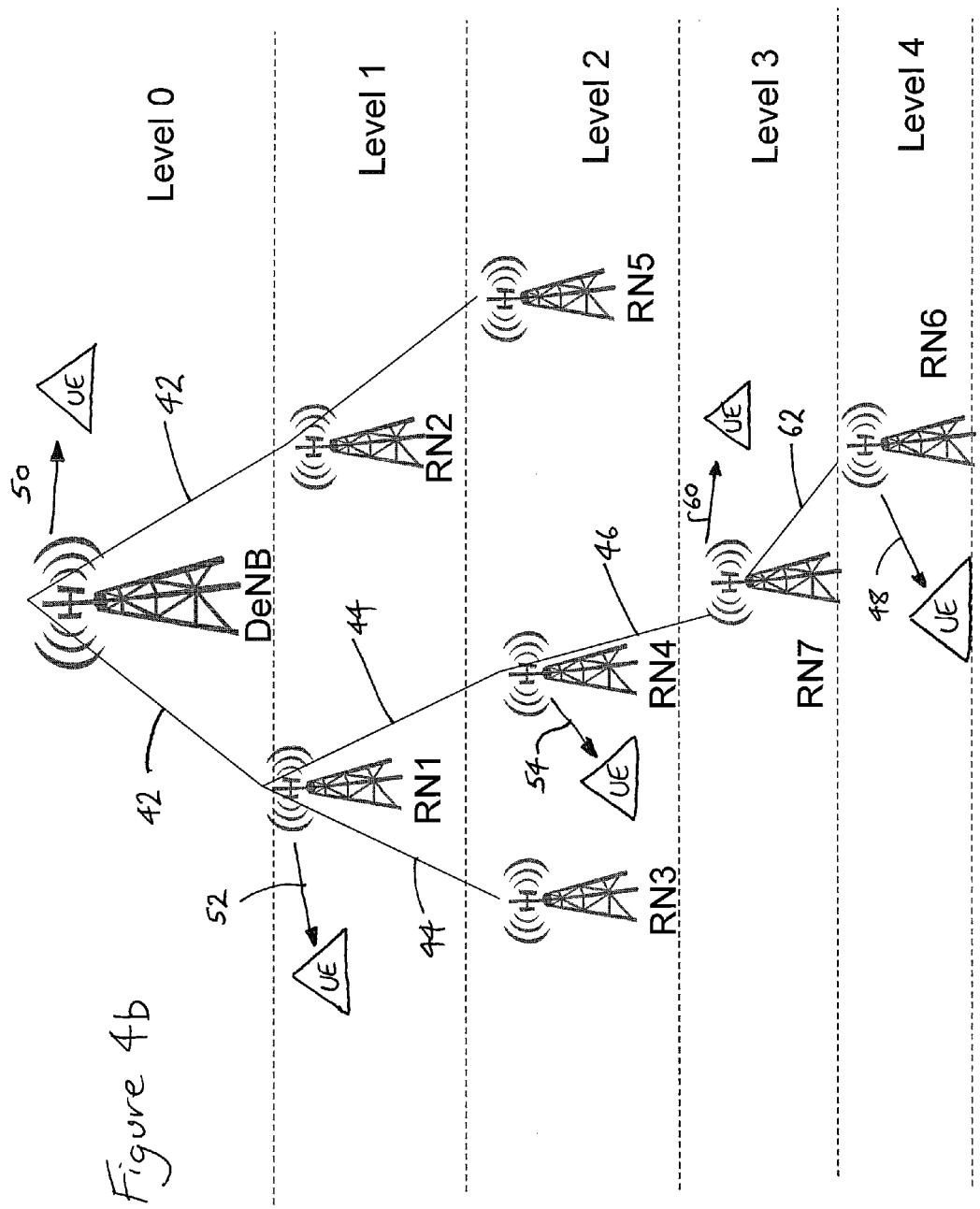
Figure 5:
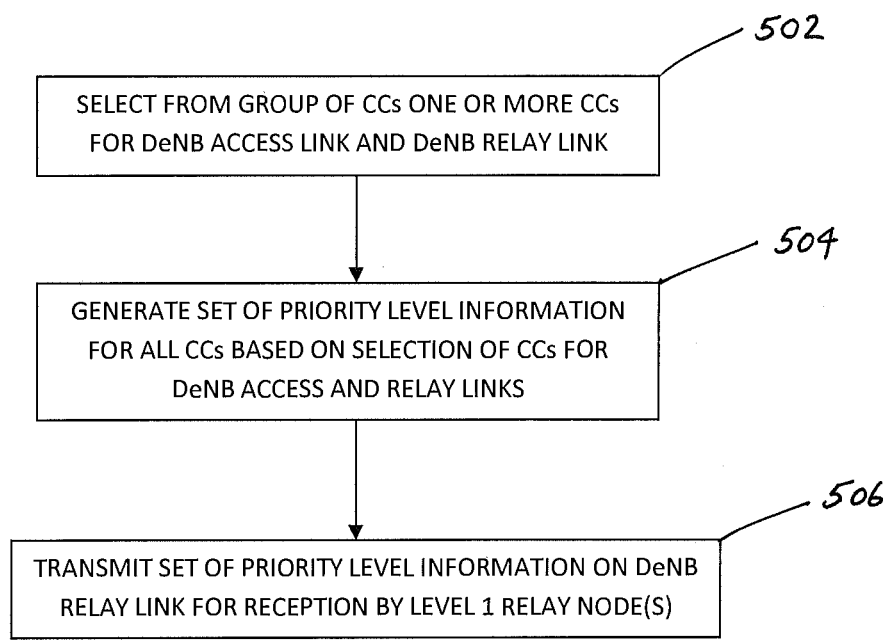
Figure 6:
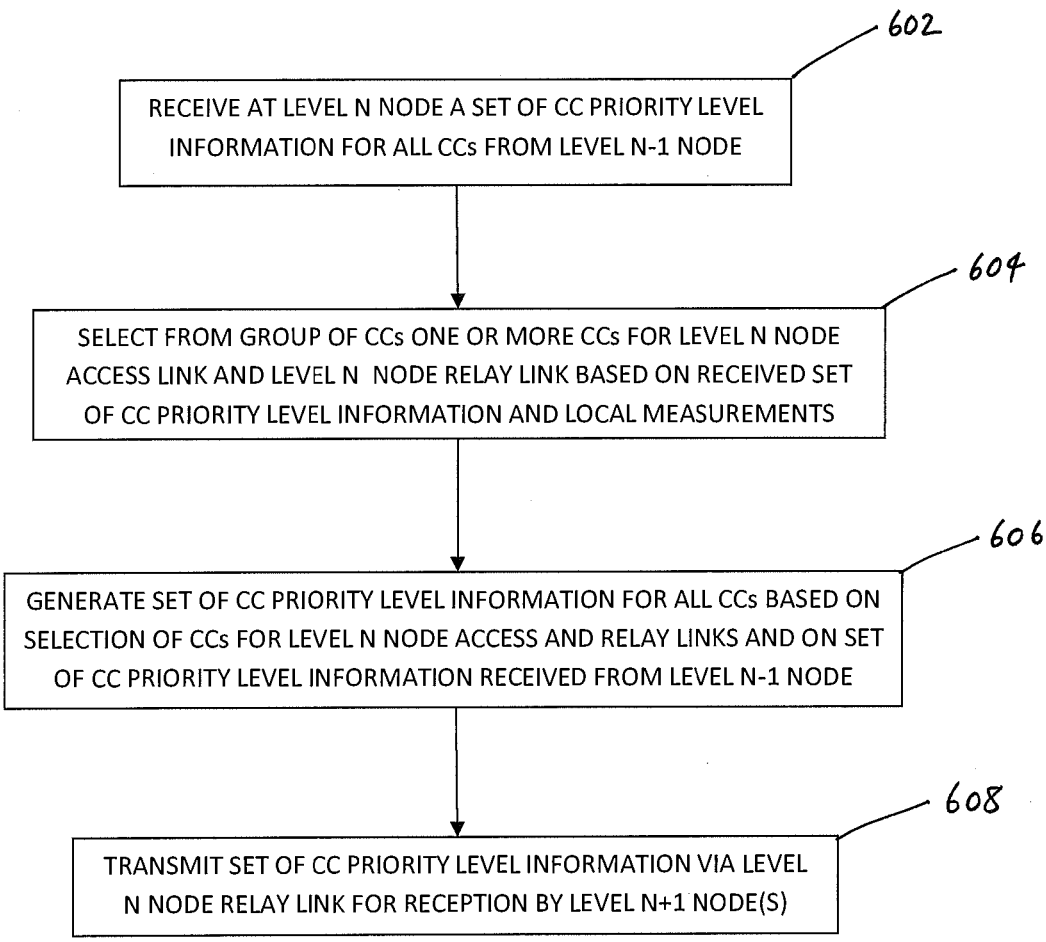
FIG. 6 illustrates one example of operations carried out at a relay node of FIG. 4a having an access link and a relay link.
Figure 7:
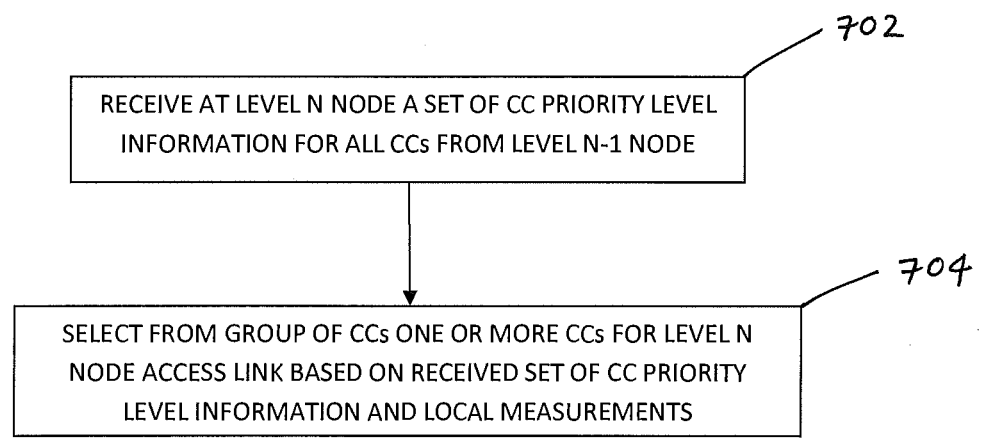
FIG. 7 illustrates one example of operations carried out a relay node of FIG. 4a having an access link but no relay link.

For example, if the set of nodes illustrated in FIG. 4a is reconfigured as shown in FIG. 4b by the introduction of a new relay node RN7 in into the network in between RN4 and RN6, i.e. RN7 connects to RN4 and RN6 connects to RN7. RN7 receives the CC priority level information from RN4, performs CC selection for its access links 60 and relay links 62 and generates its own set of CC priority level information. The new set of CC priority level information that RN7 then generates need only be transmitted to higher level relay nodes (i.e. RN6 in FIG. 4b), and not to any lower level nodes (i.e. RN4, RN 1 and DeNB in FIG. 4b). RN6 will in turn update its CC selections taking into account the new priority level information received from RN7.

In the event that a node, e.g. RN1, changes its selection of one or more CCs for its access link 52 and/or relay link 44 because, for example, of a change in traffic and/or network conditions, the new set of CC priority level information that RN1 then generates need only be transmitted to higher level relay nodes (i.e. RN3 and RN4 in FIG. 4a), and not to any lower level nodes (i.e. DeNB in FIG. 4a). The higher level nodes will in turn update their CC selections taking into account the new priority level information received from the lower level node, and will in turn generate a new set of priority level information for transmitting to any immediately higher level relay node, e.g. RN6 in case of RN4.

Also, higher level nodes can also provide feedback to lower level nodes with the aim of allowing the reuse of one or more CCs at lower level nodes that are sufficiently distant from the higher level node at which the CC is in use to render the risk of interference sufficiently small.

With the kind of technique described above, a lower level relay node (e.g. DeNB or RN1) can have some influence on the selection of CCs at a higher level node (e.g. RN4 or RN6). This kind of technique requires less signalling than would be required if the selection of CCs for all relay nodes were done at the DeNB or even more centrally; and also provides a potentially higher level of coordination compared to a technique where each relay node selects one or more CCs accordingly to local information only.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication. In addition to the modifications explicitly mentioned above, it will be evident to a person skilled in the art that various other modifications of the described techniques may be made, and that the described techniques have application in other communication systems.

The invention claimed is:

1. A method, comprising:
    selecting, by a donor node as part of an initial radio network attach procedure, one or more component carriers, each component carrier being allocated for use as a wireless link by one or more relay nodes in a series of nodes between the donor node and at least one communication device, the series of nodes being supported by a series of wireless links wherein each of the component carriers is configured for autonomous selection by a relay node according to one or more criteria specified by the donor node, wherein the one or more criteria include priorities established by the donor node;
    transmitting allocation information to at least one relay node for at least one component carrier, wherein the allocation information includes information specifying one of three predefined priority levels for each of a plurality of carriers, wherein the three priority levels are a low priority level, a medium priority level, and a high priority level; and
    wherein the low one of the predefined priority levels is assigned to a carrier which is (i) used for a wireless link between said donor node and a communication device; the medium one of the predefined priority levels is assigned to a carrier which is (ii) adjacent in the frequency spectrum to a carrier used for a wireless link between said donor node and a communication device; and the high one of the predefined priority levels is assigned to a carrier not meeting either of conditions (i) or (ii).

2. A method according to claim 1, comprising selecting the low, medium, or high priority level one of said predefined priority levels for assignment to a carrier according to the level of interference risk associated with that carrier.

3. A method according to claim 1, comprising selecting the low, medium, or high one of said predefined priority levels for assignment to at least one carrier taking into account the predefined priority level assigned to said carrier by another node in the series of nodes.

4. A method, comprising: at a relay node of a series of relay nodes between an upper order node and at least one communication device, the series of relay nodes being supported by a series of wireless links, obtaining information relating to local network conditions;

selecting one or more component carriers for the wireless link between said relay node and said at least one communication device or another relay node of said series of nodes with reference to the information relating to local network conditions and priority information received from a preceding donor node in said series of nodes, wherein said priority information indicates one of three predefined priority levels for each of a plurality of carriers, wherein each of the component carriers is allocated for use by the relay node by a donor node as part of an initial radio network attach procedure, and wherein the three priority levels are a low priority level, a medium priority level, and a high priority level; and wherein the low one of the predefined priority levels is assigned to a carrier which is (i) used for a wireless link between said one node and a communication device; the medium one of the predefined priority levels is assigned to a carrier which is (ii) adjacent in the frequency spectrum to a carrier used for a wireless link between said one node and a communication device; and the high one of the predefined priority levels is assigned to a carrier not meeting either of conditions (i) or (ii).

5. A method according to claim 4, wherein said information relating to local network conditions comprises measurements made at said one node and/or one or more devices in communication with said one node.

6. A method according to claim 5, wherein the selecting takes into account a predetermined weighting given to the priority information received-from said, and a predetermined weighting given to said measurements.

7. An apparatus comprising a processor and memory including computer program code, wherein the memory and computer program code are configured to, with the processor, cause the apparatus to:

select, by a donor node as part of an initial radio network attach procedure, one or more component carriers, each component carrier being allocated for use as a wireless link by one or more relay nodes in a series of nodes between the donor node and at least one communication device, the series of nodes being supported by a series of wireless links wherein each of the component carriers is configured for autonomous selection by a relay node according to one or more criteria specified by the donor node, wherein the one or more criteria include priorities established by the donor node;

transmit allocation information to at least one relay node for at least one component carrier, wherein the allocation information includes information specifying one of three predefined priority levels for each of a plurality of carriers, wherein the three priority levels are a low priority level, a medium priority level, and a high priority level; and wherein the low one of the predefined priority levels is assigned to a carrier which is (i) used for a wireless link between said one node and a communication device; the medium one of the predefined priority levels is assigned to a carrier which is (ii) adjacent in the frequency spectrum to a carrier used for a wireless link between said one node and a communication device; and assigning-the high one of the predefined priority levels is assigned to a carrier not meeting either of conditions (i) or (ii).

8. An apparatus according to claim 7, wherein the memory and computer program code are configured to, with the processor, cause the apparatus to select the high, medium, or low priority level for assignment to a carrier according to the level of interference risk associated with that carrier.

9. An apparatus according to claim 7, wherein the memory and computer program code are configured to, with the processor, cause the apparatus to: select the low, medium, or high one of said predefined priority levels for assignment to at least one carrier taking into account the one of the predefined priority level assigned to said carrier by another node in the series of nodes.

10. An apparatus, comprising a processor and memory including computer program code, wherein the memory and computer program code are configured to, with the processor, cause the apparatus to:

at one relay node of a series of relay nodes between an upper order node and at least one communication device, the series of relay nodes being supported by a series of wireless links, obtaining information relating to local network conditions;

select one or more component carriers for the wireless link between said relay node and said at least one communication device or another relay node of said series of nodes with reference to the information relating to local network conditions and priority information received from a donor node in said series of nodes, wherein said priority information indicates one of three predefined priority levels for each of a plurality of carriers, wherein each of the component carriers is allocated for use by the relay node by a donor node as part of an initial radio network attach procedure, and wherein the three priority levels are a low priority level, a medium priority level, and a high priority level; and wherein the low one of the predefined priority levels is assigned to a carrier which is (i) used for a wireless link between said one node and a communication device; the medium one of the predefined priority levels is assigned to a carrier which is (ii) adjacent in the frequency spectrum to a carrier used for a wireless link between said one node and a communication device; and the high one of the predefined priority levels is assigned to a carrier not meeting either of conditions (i) or (ii).

11. An apparatus according to claim 10, wherein said information relating to local network conditions comprises measurements made at said one node and/or one or more devices in communication with said one node.

12. An apparatus according to claim 11, wherein the memory and computer program code are configured to, with the processor, cause the apparatus to:

carry out the selecting taking into account a predetermined weighting given to the priority information, and a predetermined weighting given to said measurements.

* * * * *